(12) United States Patent
Tracy et al.

(10) Patent No.: US 7,349,199 B2
(45) Date of Patent: Mar. 25, 2008

(54) COMPUTER DEVICE DISPLAY PROTECTOR

(75) Inventors: Mark S. Tracy, Tomball, TX (US);
Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 182 days.

(21) Appl. No.: 11/155,084

(22) Filed: Jun. 17, 2005

(65) Prior Publication Data
US 2006/0285284 A1 Dec. 21, 2006

(51) Int. Cl.
*G06F 1/16* (2006.01)
(52) U.S. Cl. .............. 361/681; 361/683; 361/686; 248/615; 248/632; 248/633; 248/638; 455/575.1
(58) Field of Classification Search ............. 361/679, 361/683, 680, 681, 682, 684, 685, 686; 292/95, 292/110, 121, 122, 128, 175, 300, 308; 248/917–919; 345/87, 905; 349/58, 61, 62
See application file for complete search history.

(56) References Cited

U.S. PATENT DOCUMENTS

| | | | | |
|---|---|---|---|---|
| 5,729,480 A | * | 3/1998 | Katoh et al. ............ | 708/142 |
| 5,805,125 A | * | 9/1998 | Suganuma et al. ....... | 345/87 |
| 6,570,757 B2 | * | 5/2003 | DiFonzo et al. ......... | 361/683 |
| 6,791,628 B1 | | 9/2004 | Sellers | |
| 6,795,306 B2 | * | 9/2004 | Jeffries et al. .......... | 361/683 |
| 7,245,484 B2 | * | 7/2007 | Langerhans et al. ...... | 361/683 |
| 2002/0089190 A1 | | 7/2002 | Wang et al. | |
| 2002/0172002 A1 | | 11/2002 | Sasaki et al. | |
| 2006/0133019 A1 | * | 6/2006 | Yamazaki et al. ........ | 361/683 |

FOREIGN PATENT DOCUMENTS

| | | | |
|---|---|---|---|
| JP | 410049302 | * | 2/1998 |
| JP | 411284363 A | * | 10/1999 |

* cited by examiner

Primary Examiner—Michael Datskovskiy

(57) ABSTRACT

A computer device comprises a display member coupled to a base member. The computer device further comprises a display protector actuatable in response to movement of the display member relative to the base member to protect a display screen of the display member.

43 Claims, 2 Drawing Sheets

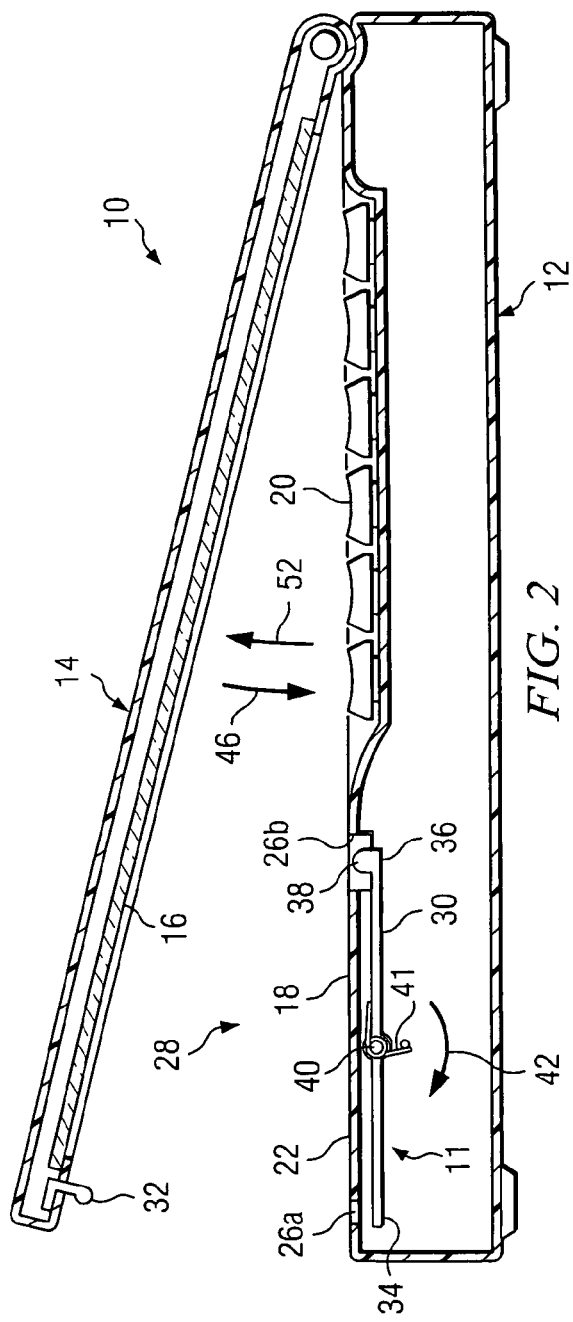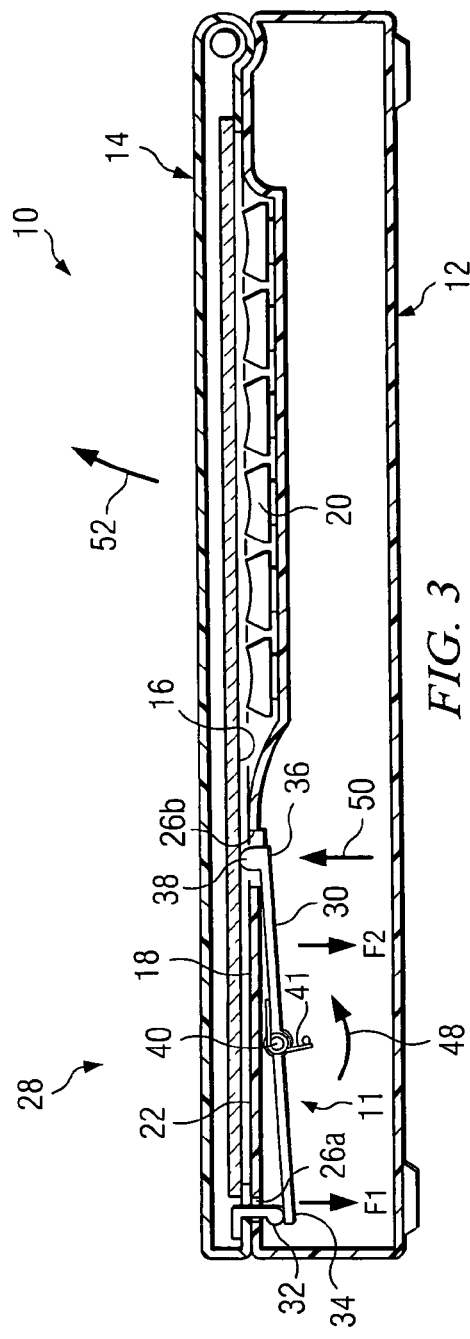

COMPUTER DEVICE DISPLAY PROTECTOR

BACKGROUND OF THE INVENTION

Devices such as laptop or notebook computers are typically transported in a carrying case with various computer accessories such as power adapters, cords, computer diskettes, a mouse, etc. If the carrying case is over-filled, the contents in the case can press against an outer surface of either a display member or a base member of the device, thereby causing a display screen of the display member to contact a keyboard or other portion of the base member. Further, movement and vibration causes the keyboard to wear against the display screen and results in a dust-like material collecting on the display screen. In addition, this movement and vibration causes scratching to the display screen, which can substantially reduce the viewing quality. In some instances, the display screen can become inoperable.

In some devices, tab/extensions have been permanently mounted adjacent the keyboard to maintain separation between the keyboard and display screen while the device is in the closed position. However, such tabs/extensions are displeasing in appearance and interfere with a user's ability to use the device (e.g., interfering with a user's wrist(s)).

BRIEF DESCRIPTION OF THE DRAWINGS

For a more complete understanding of the present invention and the advantages thereof, reference is now made to the following descriptions taken in connection with the accompanying drawings in which:

FIG. 2 is a section view of the computer device of FIG. 1 in an open position; and FIG. 3 is a section view of the computer device of FIG. 1 in a closed position.

DETAILED DESCRIPTION OF THE DRAWINGS

Figure 1:
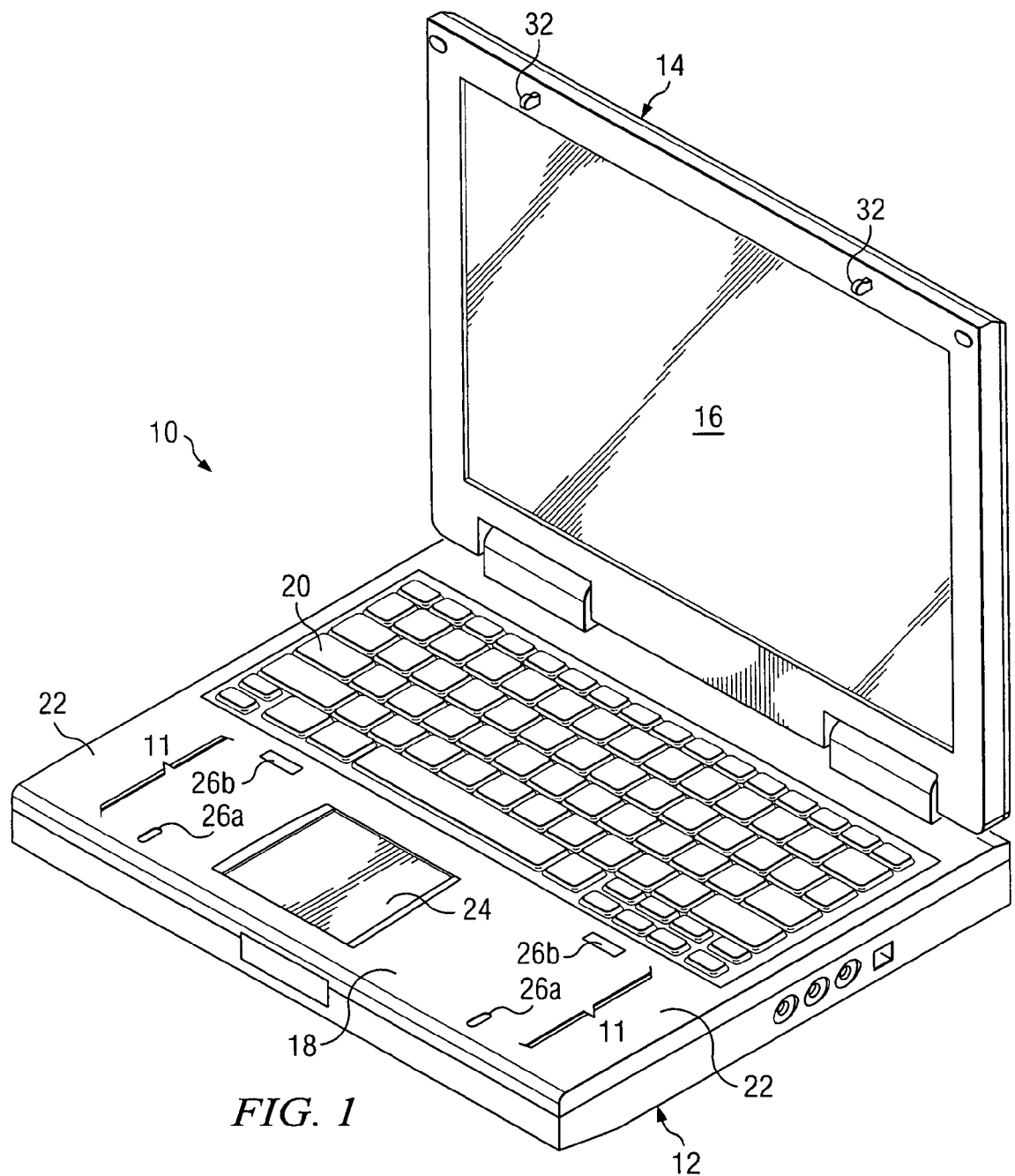
FIG. 1 is a perspective view of a computer device in which an embodiment of a display protector in accordance with the present invention is used to advantage.

The preferred embodiments of the present invention and the advantages thereof are best understood by referring to FIGS. 1-3 of the drawings, like numerals being used for like and corresponding parts of the various drawings.

FIG. 1 is a diagram illustrating a computer device 10 in which an embodiment of a display protector 11 in accordance with the present invention is employed to advantage. In the embodiment illustrated in FIG. 1, computer device 10 comprises a notebook or laptop computer having a base member 12 and a display member 14 rotatably coupled to base member 12 to enable variable positioning of display member 14 relative to base member 12. In the embodiment illustrated in FIG. 1, base member 12 comprises a working surface 18 comprising a keyboard 20, wrist supports 22, a pointing device 24, a plurality of openings 26a and a plurality of openings 26b. According to the embodiment illustrated in FIG. 1, display member 14 comprises a display screen 16, such as a liquid crystal display (LCD), and a plurality of latch hooks 32 positioned to cooperate with apertures 26a. However, it should be understood that computer device 10 may comprise any type of device having a display screen in a display member configured to be disposed in a closed position or in close proximity to a base member such as, but not limited to, a cellular or digital telephone.

FIG. 2 is a diagram illustrating an embodiment of computer device 10 in an open position with display protector 11 in accordance with the present invention. In the embodiment illustrated in FIG. 2, display protector 11 comprises a lever arm 30 disposed in base member 14 and pivotally mounted about a pivot point 40. Lever arm 30 comprises a first end 34 aligned with aperture 26a and a second end 36 aligned with aperture 26b. Second end 36 comprises an extension 38 aligned with and adapted for insertion through aperture 26b. It should be understood that extension 38 can be formed integral with lever arm 30 (e.g., formed as a single, continuous or unitary structure) or separately attachable to lever arm 30. Preferably, extension 38 is fabricated from an elastomeric material, such as rubber or the like, and is designed to be sufficiently rigid to minimize any deflection or deformation thereof; however, it should be understood that other materials may be used to form extensions 38. In the embodiment illustrated in FIG. 2, lever arm 30 is biased by a spring 41 in the direction of arrow 42 so that extension 38 is retracted inside or below aperture 26b and below working surface 18 (i.e., disposed in a retracted position) while display member 14 is positioned generally upright with respect to base member 12 (i.e., while display member is disposed in an open position). However, it should be understood that lever arm 30 may be biased in the direction of arrow 42 without spring 41 (e.g., in other ways such as, but not limited to, a pre-flexed form or shape of lever arm 30). Further, it should be understood that lever arm 30 may also be configured such that, while in the retracted position, extension 38 is disposed flush or slightly below working surface 18. In some embodiments of the present invention, display protector 11 is preferably disposed in base member 12 below wrist supports 22; however, it should be understood that display protector 11 can be disposed at other positions in base member 12.

FIG. 3 is a diagram illustrating computer device 10 in a closed position (i.e., display member 14 is disposed adjacent to base member 12 so that the outer covering of display member 14 along with base member 12 protects display screen 16 and working surface 18 during transport or storage) with an embodiment of display protector 11 in an extended position in accordance with the present invention. In operation, in response to movement of display member 14 relative to base member 14 (e.g., from an open position to a closed position relative to base member 12), latch hook 32 cooperates with aperture 26a and exerts a force F1 on first end 34 of lever arm 30. In response to force F1, lever arm 30 rotates in the direction of arrow 48 compressing spring 41, thereby resulting in second end 36 of lever arm 30 moving in the direction of arrow 50 and causing extension 38 to extend upwardly through aperture 26b into the extended position. Thus, while display protector 11 is in the extended position, extension 38 contacts display screen 16 and exerts a force toward display screen 16 sufficient to separate display screen 16 from keyboard 20 to reduce or substantially eliminate keyboard 20 or another element of base member 12 and/or working surface 18 from contacting screen 16 while display member 14 is in the closed position relative to base member 12, thereby protecting display screen 16 from damage that may otherwise occur as a result of display screen 16 contacting keyboard 20 or another element of base member 12 and/or working surface 18. Therefore, in operation, in response to movement of display member 14 relative to base member 12, display protector 11 automatically actuates without any user intervention.

According to some embodiments of the present invention, in response to reverse movement of display member 14 relative to base member 12 or movement of display member 14 away from base member 12 (e.g., transitioning computer device 10 from the closed position (FIG. 3) to the open position (FIG. 2)), display member 14 is rotated in the direction of arrow 52 relative to base member 12 to separate display member 14 from base member 12. In response to movement of display member 14 away from base member 12, latch hook 32 is removed from aperture 26a. Latch hook 32 disengages from first end 34 of lever arm 30 thereby causing spring 41 to exert a force F2 on lever arm 30 to rotate lever arm 30 in the direction of arrow 42. Movement of lever arm 30 causes extension 38 to retract into and/or through aperture 26b so that extension 38 is positioned flush or below working surface 18 and in the retracted position. Accordingly, when computer device 10 is in use by a user (e.g., in an open position as illustrated in FIGS. 1 and 2), display protector 11 (e.g., extension 38) is disposed flush or below working surface 18 so as not to interfere with keyboard 20 or any other user-accessible element of working surface 18.

Thus, embodiments of the present invention provide a computer device 10 having a display protector 11 that automatically actuates without user intervention to protect display screen 16 (e.g., by separating keyboard 20 a desired distance from display screen 16), afford transparent operation from the perspective of the user, and when computer device 10 is in use, does not interfere with a user's use of keyboard 20 or any other user-accessible element of working surface 18. In FIGS. 1-3, two display protectors 11 are illustrated. However, it should be understood that a greater or fewer quantity of display protectors 11 may be used. Further, it should be understood that a location of display protector 11 may be reversed relative to base member 12 and display member 14 (e.g., lever arm(s) 30 disposed in display member 14 and latch hook(s) 32 disposed on base member 12). Additionally, it should be understood that display protector may be otherwise located and configured (e.g., so as to contact a portion of display member 14 other than display screen 16) to maintain display screen 16 a desired distance away from working surface 18 and/or keyboard 20. Further, embodiments of the present invention protect display screen 16 by substantially preventing or eliminating contact between display screen 16 and keyboard 20 or another element of base member 12 and/or working surface 18 when the display member 14 is in the closed position relative to the base member 12.

What is claimed is:

1. A computer device, comprising:
   a display member coupled to a base member; and
   a display protector extendible in response to movement of the display member toward the base member to protect a display screen of the display member.

2. The computer device of claim 1, wherein the display protector comprises a lever arm.

3. The computer device of claim 1, wherein the display protector is disposed in the base member.

4. The computer device of claim 1, wherein the display protector comprises a biased lever arm.

5. The computer device of claim 1 wherein the display protector is disposed flush with a working surface of the base member in a retracted position.

6. The computer device of claim 1, wherein the display protector, when in a retracted position, is disposed below a working surface of the base member.

7. The computer device of claim 1, wherein the display protector is actuatable from a retracted position to an extended position in response to the movement of the display member.

8. The computer device of claim 1, wherein the display protector is adapted to automatically retract in response to movement of the display member away from the base member.

9. The computer device of claim 1, wherein the display protector is actuatable to an extended position in response to the movement.

10. The computer device of claim 1, wherein the display protector is adapted to contact a display screen of the display member.

11. A computer device, comprising:
    a display member coupled to a base member; and
    a display protector extendible in response to movement of the display member relative to the base member to maintain a display screen of the display member a predetermined distance away from the base member.

12. The computer device of claim 11, wherein the display protector comprises a lever arm.

13. The computer device of claim 11, wherein the display protector is disposed in the base member.

14. The computer device of claim 11, wherein the display protector comprises a biased lever arm.

15. The computer device of claim 11 wherein the display protector is disposed flush with a working surface of the base member in a retracted position.

16. The computer device of claim 11, wherein the display protector, when in a retracted position, is disposed below a working surface of the base member.

17. The computer device of claim 11, wherein the display protector is actuatable from a retracted position to an extended position in response to the movement of the display member.

18. The computer device of claim 11, wherein the display protector is adapted to automatically retract in response to movement of the display member away from the base member.

19. The computer device of claim 11, wherein the display protector is actuatable to an extended position in response to the movement.

20. The computer device of claim 11, wherein the display protector is adapted to contact a display screen of the display member.

21. The computer device of claim 11, wherein the display protector is adapted to maintain the display screen a predetermined distance away from the base member when the display member is in a closed position relative to the base member.

22. A method of manufacturing a computer device, comprising:
    coupling a display member to a base member; and
    providing a display protector extendible in response to movement of the display member toward the base member to protect a display screen of the display member.

23. The method of claim 22, wherein providing the display protector comprises coupling the display protector to the base member.

24. The method of claim 22, wherein providing the display protector comprises providing a lever arm.

25. The method of claim 22, wherein providing the display protector comprises providing a biased lever arm.

26. The method of claim 22, wherein providing the display protector comprises disposing the display protector flush with a working surface of the base member in a retracted position.

27. The method of claim 22, wherein providing the display protector comprises providing the display protector actuatable from a retracted position to an extended position in response to the movement of the display member.

28. The method of claim 22, wherein providing the display protector comprises providing the display protector adapted to automatically retract in response to movement of the display member away from the base member.

29. The method of claim 22, wherein providing the display protector comprises providing the display protector adapted to maintain the display screen a predetermined distance away from the base member when the display member is in a closed position relative to the base member.

30. A computer device, comprising:
  means for protecting a display means of the computer device, the protecting means extendible in response to movement of the display means toward a base means of the computer device.

31. The computer device of claim 30, wherein the protecting means is adapted to maintain the display means a predetermined distance away from a working surface of the base means when the display means is in a closed position relative to the base means.

32. The computer device of claim 30, wherein the protecting means comprises a biasing means disposed in the base means.

33. The computer device of claim 30, wherein the protecting means comprises a means adapted to extend from a retracted position at least flush with a working surface of the base means in response to the movement of the display means.

34. The computer device of claim 30, wherein the protecting means comprises means for retracting to a position at least flush with a working surface of the base means in response to movement of the display means away from the base means.

35. A computer device, comprising:
  a display member coupled to a base member; and
  a biased lever arm extendible in response to movement of the display member relative to the base member to protect a display screen of the display member.

36. The computer device of claim 35, wherein the lever arm is disposed flush with a working surface of the base member in a retracted position.

37. The computer device of claim 35, wherein the lever arm, when in a retracted position, is disposed below a working surface of the base member.

38. The computer device of claim 35, wherein the lever arm is actuatable from a retracted position to an extended position in response to the movement of the display member.

39. A computer device, comprising:
  a display member coupled to a base member; and
  a display protector extendable from a retracted position disposed below a working surface of the base member to protect a display screen of the display member.

40. The computer device of claim 39, wherein the display protector is configured to automatically retract to the retracted position in response to movement of the display member away from the base member.

41. A computer device, comprising:
  a display member coupled to a base member; and
  a display protector extendible in response to movement of the display member relative to the base member, the display protector configured to maintain a display screen of the display member a predetermined distance away from the base member when the display member is in a closed position relative to the base member.

42. The computer device of claim 41, wherein the display protector comprises a biased lever arm.

43. The computer device of claim 41, wherein the display protector is extendable from a retracted position disposed below a working surface of the base member.

\* \* \* \* \*